United States Patent [19]

Ivony et al.

[11] Patent Number: 4,620,717

[45] Date of Patent: Nov. 4, 1986

[54] JACKNIFING-AFFECTING APPARATUS FOR VEHICLES WITH ELECTRONIC CONTROL

[75] Inventors: József Ivony; Attila Madocsay; István Ratskó; Béla Horváth, all of Budapest, Hungary; Jenö Mádi, all of Budapest, Hungary

[73] Assignees: Autóipari Kutató és Fejlesztö állala; Ikarus Karosszéria éstármügyár, both of Budapest, Hungary

[21] Appl. No.: 526,134

[22] Filed: Aug. 24, 1983

[30] Foreign Application Priority Data

Aug. 23, 1983 [HU] Hungary .............................. 2752/82

[51] Int. Cl.$^4$ ................................................ B62D 53/06
[52] U.S. Cl. .................................................... 280/432
[58] Field of Search .............................. 280/432, 446 B

[56] References Cited

U.S. PATENT DOCUMENTS

| | | | |
|---|---|---|---|
| 4,366,966 | 1/1983 | Ratsko et al. | 280/432 |
| 4,412,592 | 11/1983 | Bergmen et al. | 280/432 |
| 4,455,035 | 6/1984 | Ivony et al. | 280/432 |
| 4,482,165 | 11/1984 | Dawson et al. | 280/432 |
| 4,494,765 | 1/1985 | Ratsko et al. | 280/432 |

Primary Examiner—John J. Love
Assistant Examiner—Donn McGiehan
Attorney, Agent, or Firm—Gabriel P. Katona

[57] ABSTRACT

An apparatus for an articulated vehicle for preventing jackknifing. A sensor for sensing the steered angle has a movable first element coupled to the steered wheel and a stationary second element, one of the first and second elements being divided into sections starting from the position of the steering to the left, with a discrete signal for each single section referring to its relative position and having a value differing from that of the other sections and a digital output signal characteristic of the serial number of each section. A sensor for sensing the angle of articulation has a displaceable third element connected to one of the vehicle parts, and a stationary fourth element, wherein one of the third and fourth elements is divided into sections starting from the position of the fully left articulation with a digital output signal for each section representative of the serial number and a discrete signal representing the relative position thereof and which has a value which is different from that of the other sections. An angular position evaluating unit is receptive of the output signals from the two sensors for comparing same and for indicating a positive differential sign if the serial number of the steering angle section is less than the serial number of the section of the angle of articulation and the difference between the serial numbers is greater than a predetermined value and a negative differential sign if the serial number of the section of the steering angle is larger than the serial number of the section of the angle of articulation and the difference between the serial numbers is greater than a predetermined value.

10 Claims, 9 Drawing Figures

JACKNIFING-AFFECTING APPARATUS FOR VEHICLES WITH ELECTRONIC CONTROL

BACKGROUND OF THE INVENTION

Our invention relates to a jackknifing-affecting apparatus for an articulated vehicle, in particular for so-called push-type articulated busses having electronic sensing and control units; moreover our invention is an electronic control and sensing device for said jackknifing-affecting apparatus and force and moment exerting units of said construction that can be hydraulically or mechanically operated wherein or a combined operation is also possible. Our invention also relates to an electronic device for sensing and evaluating the angular position of two turning elements, i.e. a sensor for sensing the angular position with outputs for the digital angle-signal and control signal respectively.

There are several propositions known from patent specifications for preventing jackknifing of articulated busses, that is, articulated vehicles consisting of several members. According to our knowledge, the device described in the West German Patent DE-PS No. 2 420 203 has been most widely applied in the way of practical realization.

In said apparatus four hydraulic working cylinders—arranged between the two members of the vehicle—represent the force and moment exerting elements and the common hydraulic valve unit thereof is controlled by an electronic control unit. The electronic control unit receives one of the input signals from the potentiometer sensing the angular displacement of the steered wheels of the first member of the vehicle, while the other input signal arrives from the potentiometer sensing the angle of articulation of the two members of the vehicle. The electronic microcomputer continuously compares the effective value of angle of articulation with the value of articulation ordered to the prevailing angle of the steered wheel and stored in the memory and upon reaching the permitted angle of articulation the output signal closes said two working cylinders on one side via the valve unit and prevents overarticulation in this direction. Operational safety depends fully on the reliability of the sensor with the potentiometer, of the signal forwarding lines and the electronic unit. Faultless condition of the electronic unit may be controlled by the apparatus in such a manner that upon starting the motor of the vehicle a fixed test program is allowed to run repeatedly and in case of identical results a faultless condition will be indicated. Everywhere two sensors each with potentiometers are built-in and two alarming signal lamps are provided for the driver that the apparatus could meet the requirements relating to safe operation and signalling demanded during the operation of the vehicle. The mechanical part and hydraulical cylinders of the apparatus are built-in so as to prevent, by blocking, the development of the angle of articulation at the steered front wheel which would surpass the angle of articulation in direction of the angle of articulation belonging thereto, at the same time, in case of the change of the angle of articulation in the opposite direction no influence will be exerted until reaching the angle of articulation of 0°, thereafter velocity of turning will be damped only, however, blocking against turning will not be performed.

The solution having been described in the Hungarian patent application (AU-428) corresponding to the patent U.S. Pat. No. 4,344,640 and to the published West German Patent Application No. 30 31 601.9 has no such disadvantageous properties; the device described here resists any change of the angle of articulation in any extraordinary direction. The embodiment is hydromechanically operated, with cams, with sensors matching thereto, and a difference-forming unit containing a spring-element.

Both with the aforementioned electronically controlled apparatus and the latter hydromechanical apparatus a predetermined angle of articulation is ordered for the existing steered angle of the wheel, wherein with a vehicle continuously driven on a circular path this angle of articulation is calculated and programmed into the control unit of the apparatus, assuming a slipfree rolling of the wheels.

Both with electronic control and hydromechanical solution the difference-forming comparator of the control unit is working with the highest accuracy, at the same time certain negligance is to be allowed in the course of determining the angle of articulation belonging to the steered angle of the wheel, on the other hand an articulated vehicle travelling on a public way almost never travels on a circular path with a constant radius, if only because of the lateral creeping of the tires having been influenced by dynamic forces. Accordingly, it can be stated that in practice the presently used apparatuses, i.e. the control units thereof are superfluously accurate and as a consequence a tolerance-band is to be used, the case of surpassing said band the control unit is giving the order for the actuation of force exerting elements. Although an apparatus with reduced accuracy would suffice for performing the task of control, this must not go to the debit of reliability, as faulty function of the apparatus for the prevention of jackknifing may result in severe accidents.

SUMMARY OF THE INVENTION

Based on this recognition, in creating the device of the invention it was our aim to provide a combination of angle-signal transmitting and angular position evaluating units, which fully meets the requirements relating to safe operation, its accuracy suffices for meeting said requirements, possibly it has a simple design and as a consequence, operational safety can be well increased.

According to the invention the aim set has been achieved in such a manner that with the articulated vehicles the angular range of the steered wheel is divided into sections—in compliance with the requirements relating to the sensitivity of control, in a given case with different angular apertures—, to which—supposing a travel on a stabilized circular path and slip-free rolling of the wheels—sections of the angle of articulation are ordered; to each single section a discrete signal being different from any other and to these numbering informations—of course, in digital form—are ordered; the serial numbers of angular sections ordered to one another are identical, simultaneously, the serial number refers also to the position in relation to other sections. The output signals being characteristic for the serial number of the sections are evaluated in a comparator, which is forwarding an output signal to the elements of the apparatus exerting the force and moment, respectively, if the difference between the serial numbers surpassed a definite number. As the single sections are provided with serial numbers, it results that the signal carrying the serial number is digital involving a plurality of advantageous features from the point of view of signal processing and formation of the whole controlling and checking unit. First of all, it is a practical constructional advantage, in so far as angular aperture of the single sections can be optionally chosen without decreasing the reliability of the output signal or increasing complexity of the signal receiving unit, the more, advantageous possibility is yielded for the control of the faultless function of the sensor of the angular position. The mutual difference between the magnitude of the angular apertures of the angular sections does not increase complexity of the signal processing circuits. As a result of the division into the co-ordinated sections, in course of one single process of comparing the serial numbers, in course of which output signal of the angle of articulation sensor is compared by the electronic unit with the output signal of the steered angle-sensing unit, it could be stated, whether the locking actuator should be actuated, jackknifing in which direction—in the clockwise direction when the articulated vehicle is viewed from above or in the counter-clockwise direction—should be prevented, as the sign of the difference between the serial numbers gives an unambiguous order.

Division of the range of the steered angle of the wheel and of the range of the angle of articulation into sections means the mechanical programming of the correlation between the steered angle of the wheel and the co-ordinated angle of articulation in the angular position sensing unit provided with the rotary disc into the single angular position sensors, which can be also separately controlled, while within the angular range division can be chosen with a fineness being suitable for achieving a control sensitivity depending on the extent of steering. Providing the co-ordinated angular sections with serial numbers enables the simple electronic processing of the output signals of the angular position sensors within the whole angular range beside signal processing of identical reliability. As signal processing consists but of the comparison of the serial numbers, it can be realized with an unit with relatively simple electronic circuits and as the output signal gives a sign, it is well suitable for the control of a bidirectional locking unit, i.e. for preventing either extraordinary increase or extraordinary decrease of the angle of articulation.

Our invention is an apparatus for articulated vehicles for preventing articulation in an extraordinary direction, having a locking means connected to the parts of the vehicle that are connected with the articulating hinge, the locking means being opeartively connected to an angular position evaluating unit for evaluating the angle of articulation which deviates from a predetermined angle of articulation that corresponds to the steered angle of the front wheel, which unit is arranged with the sensor for the steered angle of the front wheels of the front part of the vehicle and the sensor for the angle of articulation. The evaluating unit is connected to the actuating unit of the articulation locking means, one entering signal of which is the deviation signal determined by the exit signal of the angle evaluating unit, the deviation signal—according to choice—is positive at the angle of articulation ($\beta$), at that angle of wheel steering ($\alpha$) to which the angle of articulation ($\beta_p$) belongs,—within the determined angular range—and if, when viewed the vehicle from above, the angle of articulation ($\beta$) compared to the angle of articulation ($\beta_p$) ordered to the angle of wheel steering ($\alpha$) is lagging in the clockwise direction; the exit signal is negative, however, if the angle of articulation ($\beta$) compared to the angle of articulation ($\beta_p$) ordered to the angle of wheel steering ($\alpha$) is fast in the clockwise direction; the other input signal of the operating unit of the locking means is formed by the sign of the output signal of the angle-of-articulation direction signaler, which—according to choice—is positive at that direction of change in angle of articulation at which, when viewed from above, the articulation of the trailer part to the front part is in a clockwise direction and is negative at that direction of change of angle of articulation at which the articulation of the trailer part to the front part is counterclockwise, and the locked position of the articulation locking means corresponds to the two opposed sign signals of the locking actuating unit; to the two opposed sign signals of the locking actuating unit the locked position of the articulation locking actuator is co-ordinated, the unit sensing the angle of wheel-steering ($\alpha$) is having a moving element having been coupled to the steered wheel, and the stationary resp. moving element—according to choice—is divided into sections ($\alpha_o \ldots \alpha_n$) starting from the position of the steering absolutely to the left; to each single section ($\alpha_o \ldots \alpha_n$) a discrete signal referring to the relative position and having a value differing from that of the other section, as well as a digital output signal being characteristic for the serial number of said section are ordered; the unit sensing the angle of articulation ($\beta$) has a displaceable element connected to one of the intercoupled members of the vehicle, one of the stationary or displaceable elements is divided, defined at the sensor of the steering angle,—according to choice—into sections ($\beta_o \ldots \beta_n$) starting from the position of the fully left articulation; to every single section an output signal is ordered characterizing the serial number referring to the relative position and of a value being different from that of the other sections, as well in the steered angle ($\alpha$)-sensing unit, as well in the angle or articulation ($\beta$) sensing unit the angles forming the limits of the sections with identical serial numbers are formed by the steering angles ($\alpha$) and the angles of articulation ($\beta$) co-ordinated to one another; the connections of both sensing units forwarding the output signal are connected to the unit evaluating the angular position by means of signal forwarding elements; the unit evaluating the angulary position has comparing and evaluating elements, as well as connections for the output signal, if the serial number of the section is starting from the fully left steered position; on the connections for the output signals the differential sign is positive, if the serial number of the steering angle section—having been characterized by the output signal of the unit sensing the steering angle—is less, than the serial number of the section of the angle of articulation ($\beta$)—having been characterized by the output signal of the unit sensing the angle of articulation—and the difference between the serial numbers surpasses a defined numerical value; on the connection for the output signal the differential sign will be negative, if the serial number of the section of the steering angle ($\alpha_i$)—having been characterized by the output signal of the steered angle—sensing unit—is larger, than the serial number of the section of the angle of articulation ($\beta_i$) having been defined by the output signal of the unit sensing the angle of articulation—and the difference between the serial numbers surpasses a predetermined value.

With a preferred embodiment of our invention both units sensing the steering angle and the angle of articulation, respectively, have a rotary disc with a code-field provided with openings formed according to the Gray-code, on one side of said rotary disc light sources are arranged, while on the other side, facing said light sources, light sensing elements are to be found, which are connected by means of information forwarding elements to code-converters which convert the Gray-code signals into a binary code; said converters are connected to the comparating-evaluating electronic unit comparing the code-signal of the angular range of the steering angle of the wheel having been sensed with the code-signal of the angular range of the angle of articulation; said electronic unit has outputs for the sign of negative deviation, the state corresponding to co-ordination and the sign of positive deviation, out of which to the outputs indicating negative resp. positive deviation capacity amplifiers are connected, which again are connected to the inputs of the locking actuator. The inputs and outputs of the comparating-evaluating electronic unit are connected to electronic control circuits. The task of the circuit having been connected to the inputs lies in to control, whether at the signals of the Gray-code the difference between two following different code-signals is not more, than the allowed one bit. The circuit having been connected to the outputs controls whether the conversion from the sign of the negative deviation to the sign of the positive deviation is taking place through the signal indicating the state of co-ordination, and vice-versa. If the signal indicating the state of co-ordination doe not appear, the control circuit qualifies the apparatus as faulty. To the capacity amplifiers of the outputs indicating the differential signs the electromagnets are coupled, which actuate the hydraulic three-position four-path direction changing valve of the locking actuator.

Moreover, our invention relates to an electronic apparatus sensing and evaluating the angular position for the apparatus blocking/affecting the angle of articulation with articulated vehicles, which has a steered angle sensing unit, a unit sensing the angle of articulation, an electronic unit processing the output signals thereof; said electronic unit has three outputs, one of them is giving a signal at steering angle of the wheel and the angle of articulation co-ordinated to each other, the other is giving the output signal at a negative deviation, while the third at a positive deviation.

The design of the sensors of angular position and of the electronic unit corresponds to the electronics of the apparatus for preventing articulation in an extraordinary direction for articulated vehicles according to the invention previously described.

Moreover, our invention relates to an electronic device for sensing and evaluating the angular position, in particular for sensing and evaluating the relative angular position of two turning elements having angular sections co-ordinated to one another, with which the electronic unit processing the input signals of the unit sensing the first and second angular position has three outputs, out of which one is giving an output signal at an angular position co-ordinated to one another, the other at a negative differential sign and the third at a positive differential sign.

The design of the sensor of angular position and of the electronic unit corresponds to the electronics of the apparatus for preventing articulation in an extraordinary direction for articulated vehicles according to the invention previously described.

With the jackknifing-angle affecting apparatus the unit exerting the force affecting the angle of articulation i.e. the driving moment around the hinge connecting the vehicle-parts is formed as a piston operated hydraulic cylinder with two operating chambers, which is connected outside the longitudinal axis of the articulated vehicle with its working cylinder to the front car and with its piston to the trailer. The working space of the piston operated hydraulic working cylinder with the two working chambers is that one, which—when viewed from above—is widening to the first connection of the three-position, four-path direction changing valve, when the trailer is jackknifing in relation to the front car in a clockwise direction; the second working chamber is connected by a hydraulic line to its second connection, and an inner hydraulic loop is connected to its third and fourth connection with a check valve closing off flow from the direction of the third connection towards the fourth one; in the resting center position of the piston of the three-position, four-path direction changing valve at least the first, second and fourth connections are open to each other, in positively driven position the first and fourth connections, as well as the second and third connections, and in negatively driven position the first and third positions as well as the second and fourth positions, respectively, are connected to each other; the articulation locking means simultaneously forms the articulation direction giving means by the open position of the check valve forms a positive output signal, when the three-position, four-path direction-changing valve is in a positive position and when the three-position, four-path direction changing valve is in a negative position, then if forms a negative output signal, the closed position of the check valve provides in the positive position of the three-position, four-path direction-changing valve a negative output and in the negative position of the three-position, four-path direction-changing valve it forms a positive output signal.

The units sensing the angular position and delivering a digital signal with the apparatus according to the invention affecting the jackknifing angle are insensitive to external electric disturbance signals, changes in outer temperature does not affect their operation, forwarding of the digital signal is more reliable, than with the known apparatuses removal of the analogous signal and forwarding thereof, from the point of view of an error the signal can be controlled more unambiguously. Digital signal and division into angular ranges makes the application of a microcomputer superfluous. In contrast to the control units of known apparatuses with a complicated design, with a dynamic operation and with a microprocessor the apparatus according to the invention is based on a static operational principle, that means, that after the occurence and stopping of a momentary mechanical or electrical interferance signal the state of the system remains unaltered. Digital signal conversion and processing yield a high operational safety. In the code-discs of the unit sensing the angular position angular positions are recorded in a hazard-free code, safety of code-conversion is increased in this way too. Coders of the angular position sensors are not only performing direct digital conversion of the angular position, but simultaneously a calculating function is fulfilled, as a signal of angular position is given directly according to the desired non-linear conversion characteristic. After having set once the zero-point, the apparatus requires neither maintenance nor adjustment. With a preferred embodiment of the invention the unit sensing the angular position is formed with a code-yield according to the Gray-code and with a separate control code-field, which ensures the control of the faultless, function of the Gray-code reading elements, as well as it enables the control of the change by one bit allowed in the Gray-code.

BRIEF DESCRIPTION OF THE DRAWINGS

We present our invention in detail with the aid of FIGS. 1-9, through some preferred embodiments, in which.

DETAILED DESCRIPTION OF THE PREFERRED EMBODIMENTS

Figure 1:
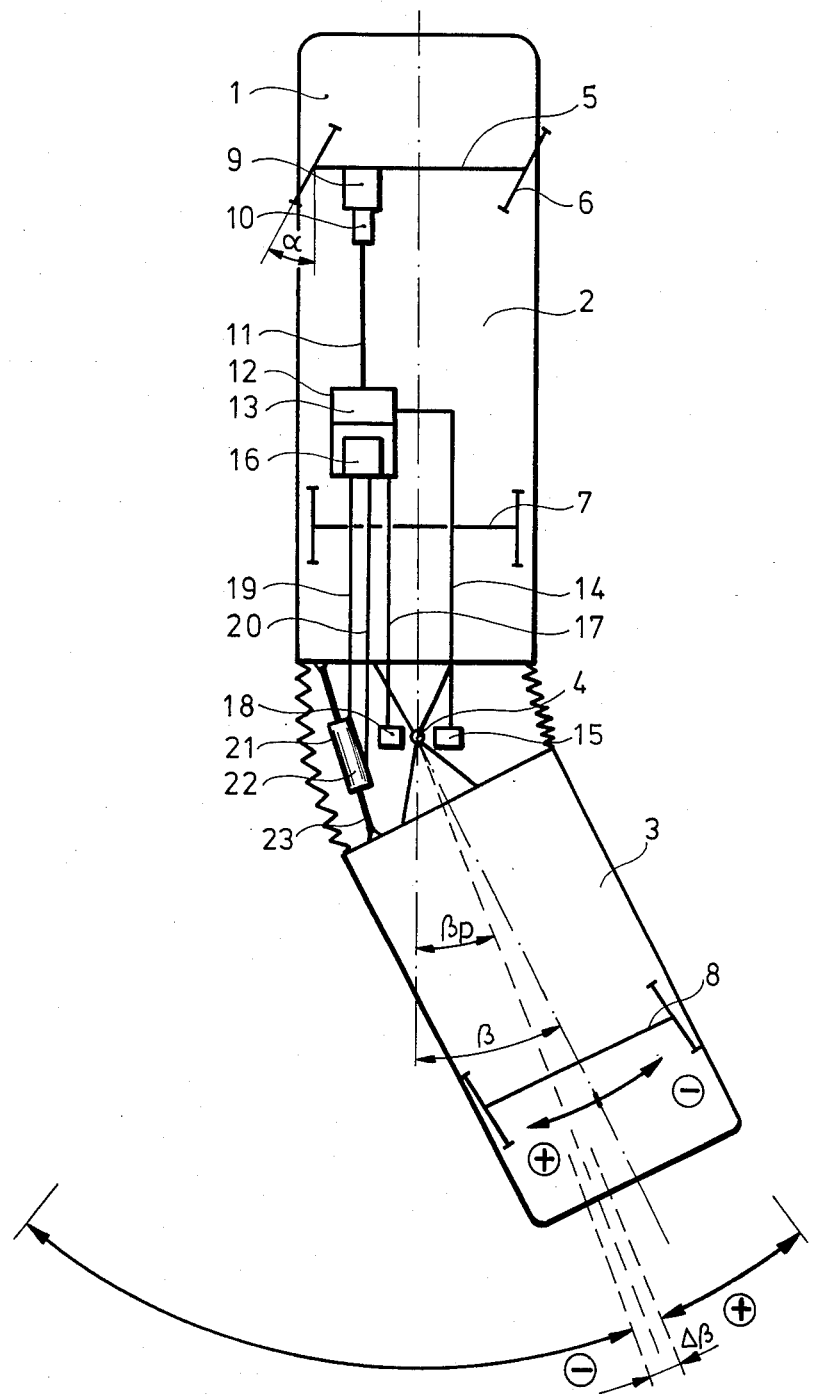
FIG. 1 shows the schematical arrangement of the angle of articulation influencing apparatus in an articulated bus with the necessary markings.

The articulated bus 1 comprises two vehicular units, a front car 2 and a trailer 3, which are connected by the hinge 4. Referring to FIG. 1, the front axle 5 of the front car 2 is steered, and in the figure the steered angle of the front wheel 6 is represented by the sign $\alpha$. The angle of articulation between the front car 2 and the trailer 3 is represented by the sign $\beta$. The rear axle 7 of the front car 2 is not steered, the axle 8 of the trailer 3 can be either steered or not. The steering mechanism 9 is coupled to the front axle 5, onto which the steered angle-sensing unit 10 for the wheel is arranged, while by means of the signal forwarding line 11 it is connected to the electronic angular position evaluating unit 13 of the control unit 12 of apparatus influencing the angle of articulation. The unit 15 sensing the angle of articulation is also connected to the angular position evaluating unit 13 through the signal forwarding line 14. The other part of the control unit 12 is formed by the locking actuator 16 of the locking device. The third sensor of the control unit 12 is formed by the sensor 18 for sensing the change of direction of articulation, which again is connected to the locking actuator 16 via the signal forwarding line 17; similarly, the hydraulic working cylinder 21 with the two working chambers—the cylinder 22 of which is coupled to the front car 2 and the piston 23 to the trailer 3—is connected thereto via the lines 19 and 20; the cylinder 21 exerts the force affecting the angle of articulation resp. the moment.

FIG. 1 is showing the articulated bus from above, in this position direction of articulation is considered, as positive, if the trailer 3 is turning around the hinge 4 in a clockwise direction, while the direction of articulation is considered as negative, if the trailer is turning counterclockwise. That means that at an articulation in the positive direction the cylinder 22 of the hydraulic working cylinder 21 with two working chambers and the piston 23 of the same are displaced in relation to each other in the direction of compression, while at an articulation in the negative direction displacement is taking place in the direction of pulling apart. Supposing a circular path, when the wheels roll without sliding, in the position shown in FIG. 1 the angle of articulation $\beta_p$ is ordered to the steered angle $\alpha$ of the wheel. The real angle of articulation $\alpha$ is larger, than the angle of articulation $\beta_p$ ordered to the angle $\alpha$, when viewed from above, the angle of articulation $\beta$ is lagging in relation to the angle of articulation $\beta_p$ in the clockwise direction. To this angular position the positive output signal of the angular position evaluating unit 13 has been ordered.

To the straightforward motion and preferably to any other articulation angle of the articulated bus 1 a tolerance-hand of $\Delta\beta$ has been applied for the control.

In case, if the angle of articulation $\beta$ is fast compared to the angle of articulation $\beta_p$ in the clockwise direction, to this angular position the negative output signal of the angular position evaluating unit 13 will be ordered.

The sign of the change of the direction of the angle of articulation and the output signal—carrying a sign—of the angular position evaluating unit 13 are forming the input signal of the locking actuator 16, while to the two input signals of opposite sign the locked position of the device locking articulation has been ordered.

Figure 2:
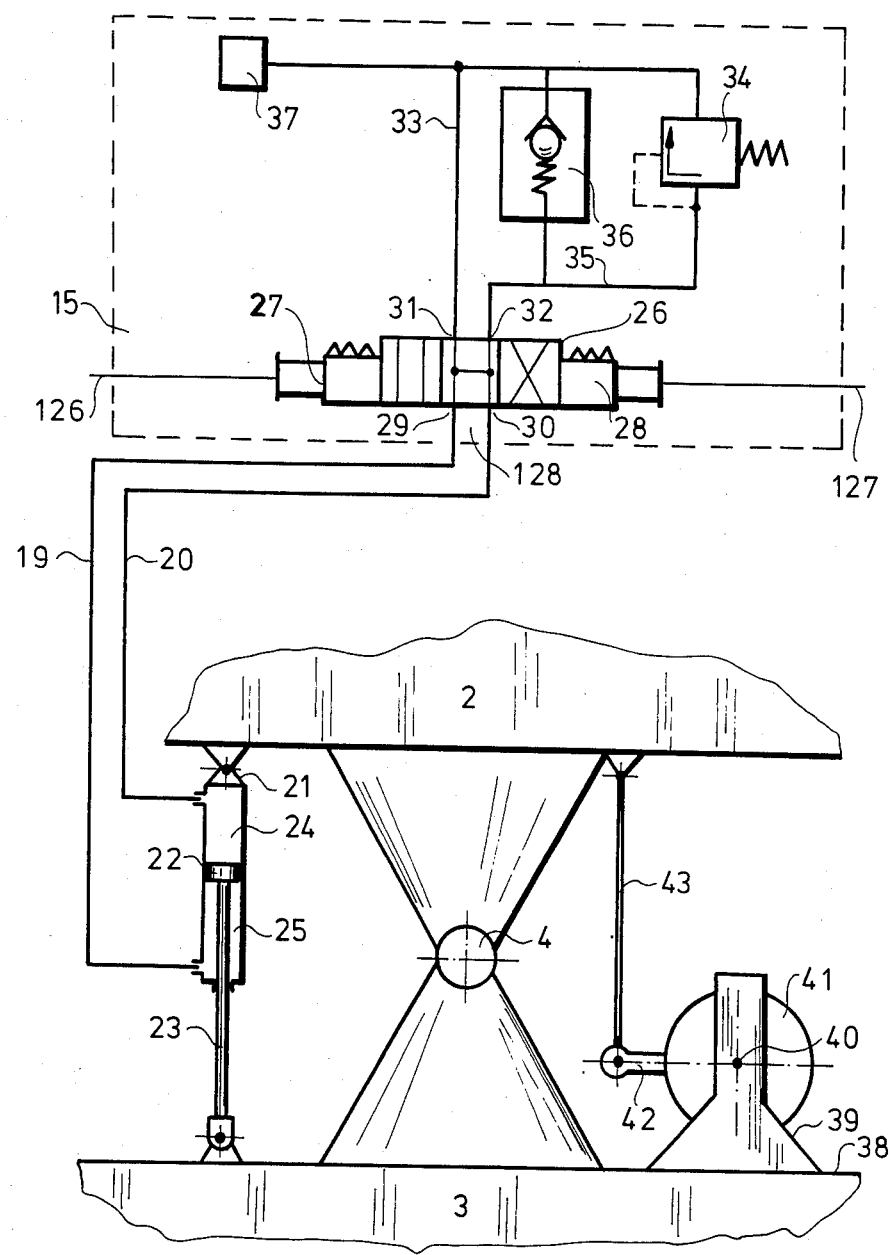
FIG. 2 shows the hydraulic unit exerting the force affecting the angle of articulation, i.e. the moment, as well as arrangement of the transmitter transmitting the signal of the angle of articulation.

FIG. 2 is showing the hydraulic working cylinder 21 with the two working chambers and the locking actuator 16. The first working chamber 25 of the hydraulic working cylinder 21 is connected via the line 19, the second working chamber 24 via the line 20 to the first connection 29, resp. second connection 30 of the three-position, four-path direction changing valve 26, while the third connection 32 and the fourth connection 31 thereof are interconnected by the hydraulic loop 33, in which there is the check valve 36—connected by means of the line 35—arranged, blocking the flow towards the fourth connection 31 from the third connection 32, parallel with said check valve the pressure limiting valve 34 is to be found. The hydraulic loop 33 is connected to the hydraulic vessel 37. The slide valve 27 of the three-position, four-path direction changing valve 26 is provided with the electromagnets 28, which again are connected to angular position evaluating unit 13. In the resting center position of the slide valve 27 of the three-position, four-path direction changing valve 26 at least the first 29, the second 30 and the fourth connection 31 are open to each other. With this embodiment the hydraulic working cylinder 21 with the two working chambers and the locking actuator 16 are simultaneoulsy forming the sensor 18 for sensing the change of direction of articulation. The open position of the check valve 36 is forming an output with positive sign at the positive position of the three-position, four-path direction changing valve 26, while at the negative position of the three-position, four-path direction changing valve 26 an output with negative sign is formed; the closed position of the check valve 36 is forming an output with a negative sign at the positive position of the three-position, four-path direction changing valve 26, while at the negative position of the three-position, four-path direction changing valve 26 an output with positive sign is formed.

Figure 3:
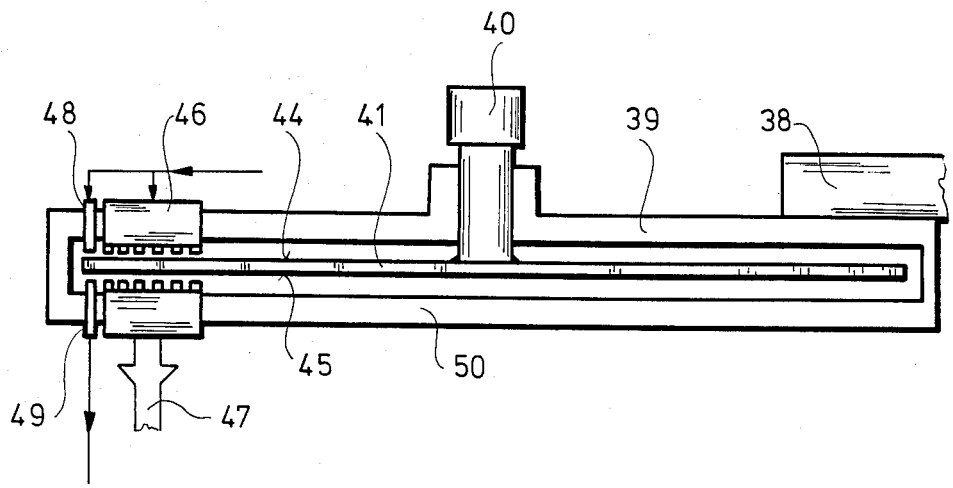
FIG. 3 is the sectional view of the unit sensing the angle of articulation.

FIG. 2 is showing the arrangement of the unit 15 sensing the angle of articulation. On the console 38 of the trailer 3 the frame 39 is fixed which forms the stationary element of the unit 15 sensing the angle of articulation; the code-disc 41 arranged on the axle 40 supported in bearings in said frame is forming the moving element, which is connected with the rocker 42 and the push bar 43 to the front car 2 by means of hinges. The unit 15 sensing the angle of articulation—the elements of which are identically formed with the moving and stationary elements of the steered angle-sensing unit 10—is to be seen in FIG. 3. The code-disc 41 fixed on the axle 40 in the frame 39 is supported in a bearing in a rotatable manner. The light sources 46 directed to the side 44 of the code-disc 41 are fixed in the frame 39, while the light sensing elements 47 are fixed so in the frame 39, as to be directed to the side 45 of the code-disc 41, and which are reading the code-signals relating to the angular position. The light source 48—serving for reading the control code-field—is fixed in the frame 39 and is directed to the side 44 of the code-disc 41, on the opposite side, directed to the side 45, the light-sensing element 49 is fixed. The unit 15 sensing the angle of articulation is enclosed in the closed housing 50.

Figure 4:
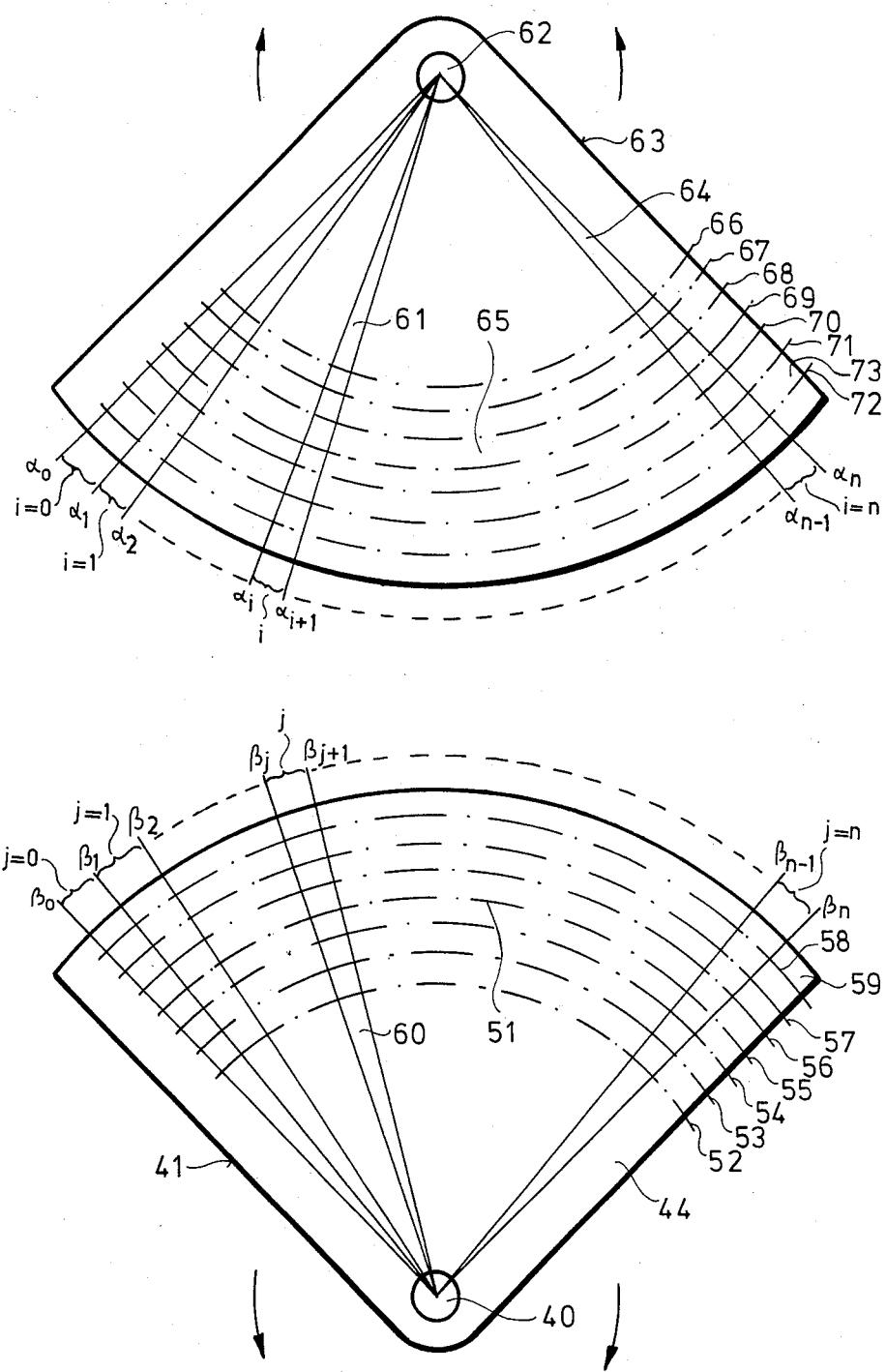
FIG. 4 is showing the rotary discs of the unit sensing the steer angle of the wheel and the angle of articulation, respectively, with the pertinent code-fields, FIG. 5 the rotary disc according to the Gray-code.

The code-disc 41 of the unit 15 sensing the angle of articulation, as well as the code-disc 63 of the steered angle sensing unit 10 rotating on the pin 62 are shown schematically in FIG. 4 (top view). In the code-field 51 of the code-disc 41 on six circular arcs the row of openings 52–57 are arranged, formed in hazard-free Gray-code.

The combination of the row of openings 52–57 divides into $n=64$ pieces of angular section 60 the whole domain of the angle of articulation. In a similar manner, in the code-field 65 of the code-disc 63, on six circular arcs the row of openings 66–71 are arrenged, formed in a hazard-free Gray-code. The combination of the row of openings 66–71 divides into $n=64$ angular sections 61 the whole domain of the steered angle of wheels. Accordingly, to the steering angular section 61—supposing the travel of the articulated vehicle 1 on a circular arc of constant radius and slide-free rolling of the wheels—the section 60 of the angle of articulation has been ordered, as well as to each single section the code-combination being characteristic for its own serial number has been ordered.

The angular sections 64 containing the angles $\beta_o$ and $\beta_n$ are representing exceptions, to said extreme sections always a locked state is ordered. The steering angular section 61 is the i-th, the co-ordinated section 60 of the angle of articulation the j-th, while numbering begins with $i=0$ and $j=0$, at our example $i=j$. The angular section 61 is limited by the steering angular value $\alpha=\alpha_i$, as well as by the angular value $\alpha=\alpha_{i+1}$. The section 60 of the angle of articulation is limited by the angle $\beta=\beta_j$ ordered to the angle $\alpha_1$, as well as by the angle $\beta=\beta_{j+1}$ having been ordered to the angle $\alpha_{i+1}$.

On the code-disc 41 the control code-field 59 having been formed as the row of the openings 58 is to be found, whereas on the code-disc 63 the control code-field 73 formed as the row of openings 72 is arranged.

Figure 5:
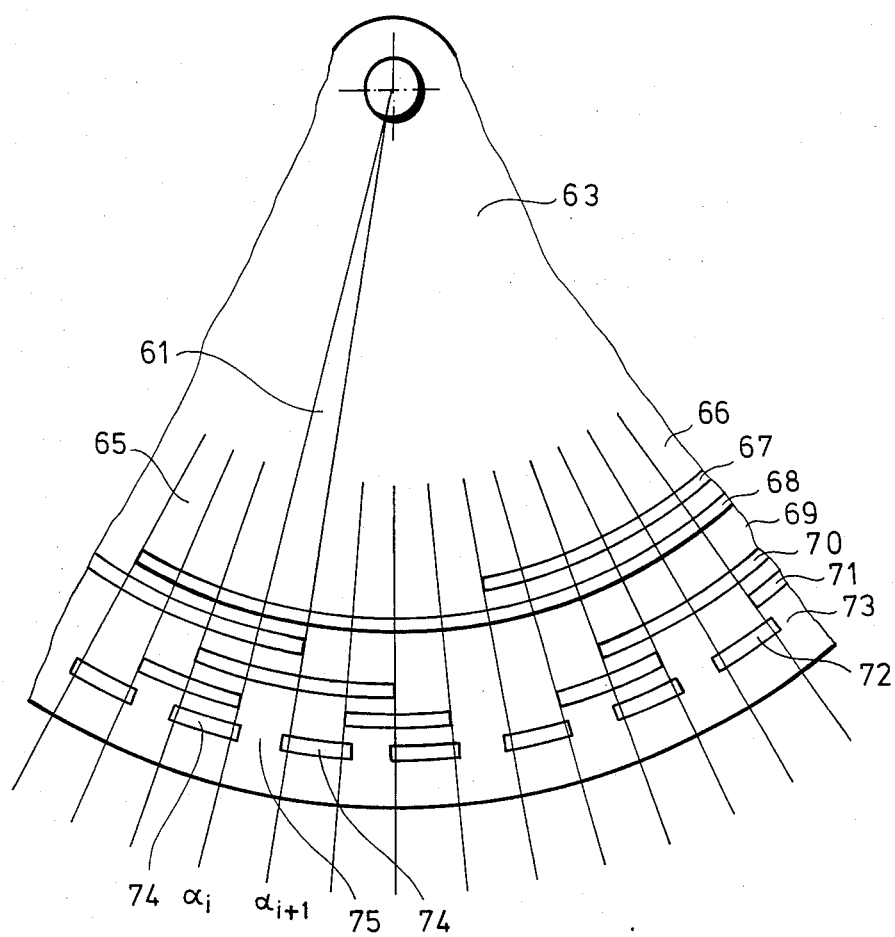

FIG. 5 is showing the formation of the code-disc 63 resp. of the code-field 65. In the row of openings 66–71 the openings are formed with a length of arc having been defined by the Gray-code. In the row of openings 72 of the control code-field 73, in every odd-numbered angular section 61 there is one single signalling section formed and in such a manner that neither end of the signalling section 75—which is enclosed by two openings 74—is reaching the boundary of the confining angular section $\alpha_i$ resp. $\alpha_{i+1}$. With odd-numbered angular sections—resulting from the characteristics of the Gray-code—always odd-numbered transilluminated opening-rows (66–71) will be in the code-field 65. Accordingly, with these code-field 65 and control code-field 75 even at the total failure of the steered angle sensing unit 10 an error signal appears, as the control unit 12 is sensing the signal belonging to the signalling section 75, at the same time no signal arrives from the opening-row (66–71) of the code-field 65, so the even-numbered parity will be considered as erroneous by the control unit 12. The ends of the signalling section 75 do not reach the boundaries of the two confining even-numbered angular sections $\alpha_i$ resp. $\alpha_{i+1}$, because in such a manner code-control is taking place after crossing the angular boundary, i.e. at the safe occurence of code-conversion.

Figure 6:
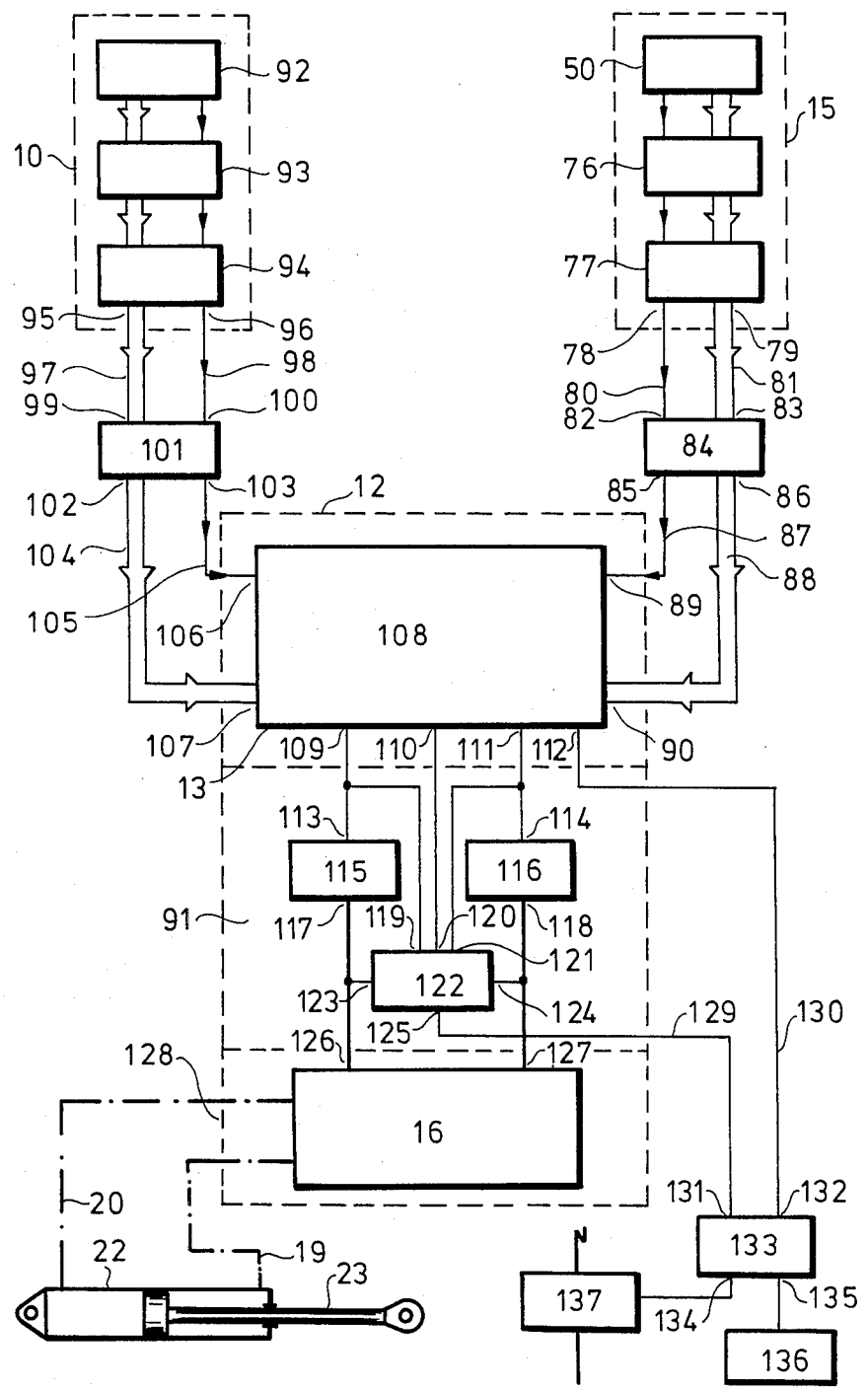
FIG. 6 is showing the block schematic of the electronic system, FIG. 7 the first version of the angular position evaluating unit of the system according to FIG. 5, FIG. 8 the second embodiment of the angular position evaluating unit of the system according to the FIG. 5.

The steered angle sensing unit 10 is designed so, as shown in FIG. 6, that it is formed by the matching circuit 93 and the line-driving unit 94, the first output 95 of which is the information signal output, the second output 96 is the control signal output. The first output 95 is connected to the first input of the line-receiving unit 101 through the line 97 transmitting information, the second output 96 is connected via the line 98 transmitting informations with the second input 100 of the line-receiving unit 101. The line-receiving unit 101 is matching the Gray-coded signals having been received on the first input 99 for further processing, and emits them on its first output 102, similarly the control code-signal is leaving on its second output 103. The first output 102 is connected to the first input 107 of the control unit 12 via the information transmitting line 104, while the second output 103 is connected via the information transmitting line 105 to the fifth input 106 of the control unit 12.

The steered-angle sensing unit 10 is arranged in the closed housing 92, which is provided with the first output connection 95 and the second output connection 96.

The unit 15 sensing the angle of articulation is formed so, that it incorporates the matching circut 76 and the line-driving unit 77, the first output 79 of which is the information signal output, the second output 78 is the control signal output. The first output 78 is connected via the information transmitting line 81 to the first input 83 of the line-receiving unit 84, while the second output 78 is connected via the information transmitting line 80 to the second input 82 of the line-receiving unit 84. The line-receiving unit 84 is matching the Gray-coded signals having been received on its first input 83 to further processing, and emits the signals on its first output 86, similarly, the control code-signals are emitted on its second output 85. The first output 86 is connected through the information transmitting line 88 to the second input 90 of the control unit 12, the second output 85 is connected via the information transmitting line 87 to the fourth input 89 of the control unit 12.

The unit 15 sensing the angle of articulation is arranged in the closed housing 50, which is provided with the first output connection 79 and the second output connection 78.

The third input 128 of the control unit 12 is the input receiving the signal being characteristic for the direction of articulation, which is formed as a preconnection, as the hydraulic working cylinder 22 with the two working chambers is really sensing the direction of articulation, the pipe-line 20 connected with the working chamber 28, resp. the pipe-line 19 connected with the working chamber 25 are connected to the third input 128. The control unit 12 has electronic memory 108 with a fixed program and the four data-input thereof are indentical with the first input 90, the second input 107, the fourth input 89 and the fifth input 106 of the control unit 12. The output of the memory 108 with the fixed program and the inputs of further elements of the control unit 12 are connected. The memory 108 with the fixed program represents the angular position evaluating unit, on the first output 109 thereof an output signal is ordered to the deviation with a negative sign, on the second output 110 the output signal is ordered to the state of mutual co-ordination, while on the third output 114 an output signal is ordered to the deviation with positive sign.

The part of the control unit 12 between the angular position evaluating unit 13 and the locking actuator 16 is formed as a control unit 91, which has the first 130 and second 129 error signalling terminals.

To the first output 109 of the memory 108 the input 113 of the power amplifier 115, to the third input 111 the input 114 of the power amplifier 116 are connected and the outputs 117 resp. 118 thereof are interconnected with the first input 126 resp. second input 127 of the locking actuator 16.

The third input of the locking actuator 16 is identical with the third input 128 of the control unit 12.

There is a control circuit 122 contained which controls the function of the power amplifiers 115 and 116. The first input 119 of the control circuit 122 is connected to the first output 109, to the second input 120 the second output 110, to the third input 121 the third output 111, to the fourth input 124 the output 118, while to the fifth input 123 the output 117. The control circuit 122 has an error signalling output 125. The control circuit 122 controls two types of signal combinations. Partly it controls, whether conversion is properly taking place, as in case of faultless operation the signal appearing on the first input 119 can be converted only then to the signal appearing on the third input 121, if meanwhile on the second input 120 a signal also appears. In a contrasting case an error signal will appear on the output 125. Partly the task of the control circuit lies in to control, whether the signal ordered to the signal appearing on the first output 109 is appearing on the output 117, i.e. whether the signal ordered to the signal appearing on the third output 111 appears on the output 118. In a contrasting case an error signal appears on the output 125. In addition to the control circuit 122 the memory 108 itself with the fixed program also controls formation of angular signals and processing thereof based on the program contained, while to the error detected an error signal is ordered on the error-signalling fourth output 112. The fourth output 112 is connected to the first input 132 of the switching circuit 133 by means of the first error-indicating terminal 130 of the control unit 12, the output 125 is connected via the second error-indicating terminal 129 of the control unit 12 to the second input 131 of the switching circuit 133. The output 135 of the switching circuit 133 is connected to the signalling device 136, while the second output 134 is connected to the main switch 137.

To the error-signal appearing on the first input or second input 132, 131—or both—of the switching circuit 133 both on the first output 135 and second output 134 an actuating signal is ordered for the signalling device 136, and the main switch 137, said equipment being incorporated in the mains, and if the actuating signal appears on the second output 134, current supply will be interrupted.

Figure 7:
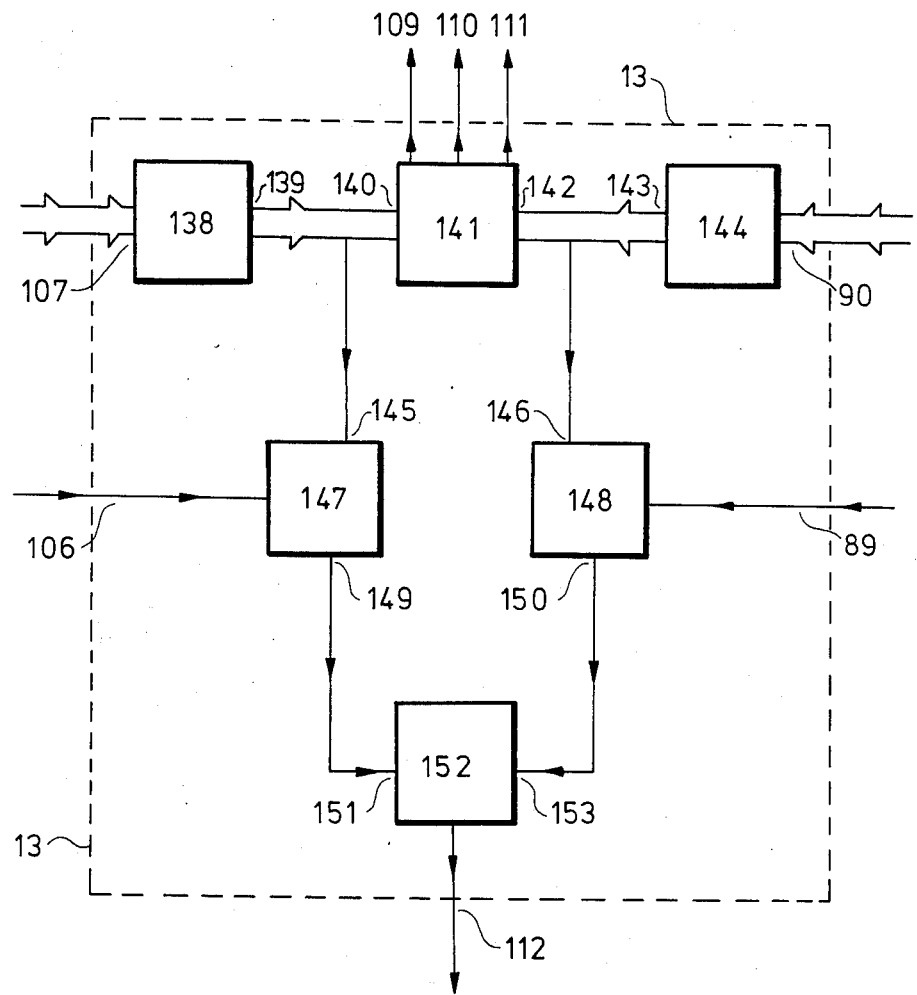

In FIG. 7 the block schematic of a further possible embodiment of the angular position evaluating unit 13 is to be seen. The first input 90 of the angular position sensing unit 13 is formed by the input of code-converter 144. The code-converter 144 converts the Gray-code into a binary code, the output 143 is connected to the first input 142 of the comparator circuit 141. The second input 107 of the angular position evaluating unit 13 is formed by the input of the code-converter 138. The code-converter 138 converts the Gray-code into a binary code, the output 139 thereof is connected to the second input 140 of the comparator circuit 141.

The three outputs of the comparator circuit 141 are identical with the first output 109, the second output 110 and the third output 111 of the angular position evaluating unit 113. To the bit-transmitting connection characterizing the parity of Gray-code and having the lowest local value of the output 143 of the code-coverter 144 the first input 146 of an inverting OR-gate 148 is connected, while the second input corresponds to the fourth input 89 of the angular position evaluating unit 13.

To the bit-transmitting connection characterizing the parity of the Gray-code and having the lowest local value of the output 139 of the code-converter 138 the first input 145 of the inverting OR-gate 147 is connected, while the second input thereof is identical with the fifth input 106 of the angular position evaluating unit 13. The output 149 of the inverting OR-gate 147 is connected to the first input 151 of the OR-gate 152, while the 150 output of the inverting OR-gate 148 is connected to the second input 153 of the OR-gate 152. The output of the OR-gate 152 corresponds to the error-indicating fourth output 112 of the angular position evaluating unit 13.

Figure 8:
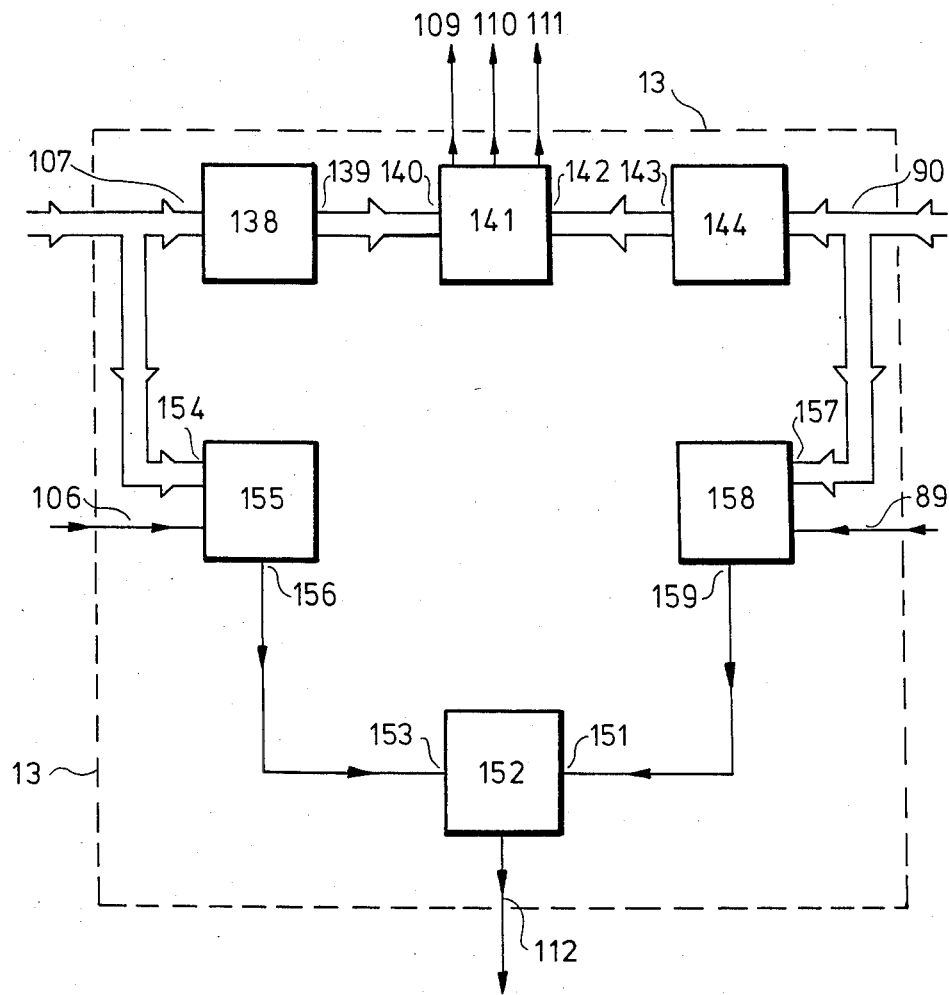

In FIG. 8 the block schematic of a further version of the angular position evaluating unit 13 is to be seen. The first input 90 of the angular position evaluating unit 13 is formed by the input of the code-converter 144, while the output 143 thereof is connected to the first input 142 of the comparator circuit 141. The second input 107 of the angular position evaluating unit 13 is formed by the input of the code-converter 138. The output 139 of which is connected to the second input 140 of the comparator circuit 141.

The three outputs of the comparator circuit 141 are identical with the first output 109, second output 110 and third output 111 of the angular position evaluating unit 13. The second input 107 is connected to the date-input 154—receiving the Gray-coded signal—of the gated, parity controlling circuit 155. The gate-input of the gated, parity controlling circuit 155 corresponds to the fifth input 106 of the angular position evaluating unit 13. The first input 90 is connected to the data-input 157—receiving the Gray-coded signal—of the gated, parity controlling circuit 158. The gate-input of the gated, parity controlling circuit 158 is identical with the fourth input 89 of the angular position evaluating unit 13. To the output 159 resp. 156 of the gated, parity controlling circuits 158 and 155 the OR-gate 152 is connected with its first input 151 and second input 153, respectively, the output of which corresponds to the fourth fault-indicating output 112 of the angular position evaluating circuit 13.

Figure 9:
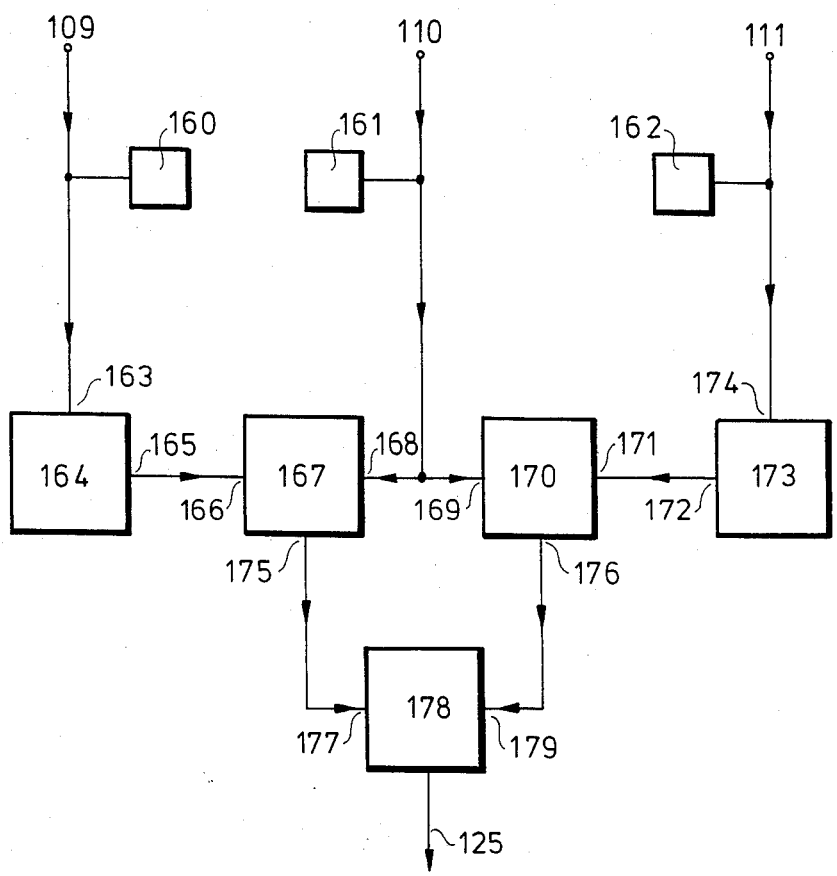
FIG. 9 is showing the control circuit controlling the output signals of the angular position evaluating unit.

In FIG. 9 a further embodiment of the control circuit is to be seen which controls the output signals of the angular position evaluating unit 13 either directly, or after the power amplifiers 115 and 116. The three outputs of the angular position evaluating unit 113, i.e. the first output 109, the second output 110 and the third output 111, are connected—one after the other—to the light signals 160, 161, 162. In addition, the first output 109 is connected to the input 163 of the levelling circuit 164, the output 165 of which is connected to the registering input 166 of the bistable circuit 167, while the erasing input 168 is connected to the second input 110. Similarly, the third output 111 is connected to the input 174 of the levelling circuit 173, whie the output 172 thereof is connected to the registering input of the bistable circuit 170, the erasing input 169 is connected to the second output 110. The output 175 of the bistable circuit 167 is connected to the first input 177 of the OR-gate 178, whereas the output 176 of the bistable circuit 170 is connected to the second input 179 of the OR-gate 178. The output of the OR-gate 178 corresponds to the fault-signalling output 125.

The jackknifing affecting apparatus operates, as follows:

The six light-sensing elements 47 of the code-field 65 of the code-disc 63 in the steered angle sensing unit 10, facing the light-sources 46, which are transilluminating the opening-rows 66–71, deliver a code-signal in compliance with the combination of the openings, which is transferred via the matching circuit 93 to the line-driving unit 94.

The light-sensing element 49 of the control code-field 73 of the code-disc 63 facing the light-source 48, which is transilluminating the opening-row 72, emits a control signal which is received by the line-driving unit 94 through the matching circuit 93. The steered angle sensing unit 10 transmits from the steering mechanism 9 to the line-receiving unit 101—arranged in the vicinity of the control unit 12 in the rear part of the front car 2—the signals appearing in the Gray-code and being characteristic for the serial number of the transluminated angular section through the information transmitting line 97, while the controlling code-signal is transmitted on the information transmitting line 98. The line-receiving unit 101 transfers the signals according to the Gray-code to the first input 107 of the control unit 12, the control signal to the fifth input 106 through the short information transmitting lines 104 resp. 105.

Similarly to the previously described solution, the six light-sensing elements 47 of the code-field 51 of the code-disc 41 of the unit 15 sensing the steered-angle, facing the light-sources 46 transilluminating the opening-rows in said code-field emit a code-signal in compliance with the combination of the openings, which is received by the line-driving unit 77 through the matching circuit 76. The light-sensing element 49, lying opposite to the light-source 48 transilluminating the opening-row 58 in the control-code-field 59 of the code-disc 41 emits a control signal, which is received by the line-driving unit 77 through the matching circuit 76. The unit 15 sensing the angle of articulation transmits the signals appearing in the Gray-code and characterizing the serial number of the transilluminated angular section is led to the control unit 12 i.e. to the line-receiving unit 84 in the close vicinity thereof, through the information transmitting line 81, while the control code-signals are forwarded on the information transmitting line 80. The line-receiving line 84 transmits the signals according to the Gray-code to the second input 90 of the control unit 12, while the control signal is led to the fourth input 89 via the short information transmitting lines 88 and 87, respectively.

The first input 107, the second input 90, the fourth input 89 and the fifth input 105 are the address-lines of the memory 108 with the fixed program, which is forming the angular position evaluating unit. In accordance with the program stored, the memory 108 with the fixed program converts and controls the signals in the Gray-code arriving on the first input address-line 90 and the second input address-line 107.

If as a result of comparison it becomes obvious that there is no difference between the serial numbers, an output signal appears on the second output 110. In this case the locking actuator 16 does not actuate.

If as a result of the comparison it can be stated that the serial number of the signal having arrived at the second input 90 characterizing the serial number of the read articulation angular section $\beta_j$ is smaller, than the serial number of the signal arriving at the first input 107 characterizing the serial number of the read steered angular section $\alpha_i$, the signal appears on the first output 109, forming a deviation with a negative sign.

If, however, as a result of the comparison it can be stated that the serial number of the signal having arrived at the second input 90 characterizing the serial number of the read articulation angular section $\beta_j$ is larger, than the serial number of the signal arriving at the first input 107 characterizing the serial number of the read steered angular section $\alpha_i$, the signal will appear on the third output 111, forming a deviation with a positive sign. This situation is illustrated in FIG. 1. Now, the signal appearing on the third output 111 is taken over by the input 114 of the power amplifier 116, as well as by the third input 121 of the control circuit 122. The signal appearing on the output 118 of the power amplifier 116 is taken over by the control circuit 122 on its fifth input 124, as well as by the locking actuator 16 on the second input 127 thereof. The actuating signal of high current-intensity received on the fifth input 124 in the control circuit 122 appears on the output of the current—and voltage observing electronic circuit in such a form, which is suitable for being compared with the control signal of low current-intensity having been received on the third input 121 within the electronic comparator circuit. In case, if on the third input 121 and fifth input 124 the signals simultaneously appear, no error-signal will appear on the output 125 of the control circuit 122. In case, if no concurrent signals appear simultaneously on said inputs, an error signal appears on the output 125 which actuates through the switching circuit 133 the signalling device 136 and releases the main switch 137.

In case of faultless function the locking actuator 16 is taking over on the second input 127 the actuating signal of high current-intensity from the output 118 and deflects through the electromagnet 28 in a positive position the slide valve 27 of the three-position, four-path direction changing valve 26. The direction of locking produced in said position of the slide valve 27 will be determined by the sign of the signal arriving at the third input of the control unit 12. With the embodiment described here, the third input 128 is formed commonly by the first connection 29 and the second connection 30 of the three-position, four-path direction changing valve 26.

Let us suppose that in viewing the trailer 3 from above, the trailer 3 is rotating in a counterclockwise direction, i.e. in the negative direction around the hinge 4 interconnecting the vehicle parts, then the hydraulic fluid is streaming from the working chamber 25 of the hydraulic cylinder with two working chambers in the line 19 to the first connection 29, therefrom—as the slide valve 27 is in its positively deflected position—it flows to the third connection 32, while the fluid itself is closing the check valve 36, accordingly, locking is taking place against an articulation process in the negative direction. In this case the apparatus is not locked against an articulation process in the positive direction, as in case of a positive direction of articulation the hydraulic fluid is streaming from the first working chamber 24 through the line 20 to the second connection 30, therefrom to the fourth connection 31, passing through the hydraulic loop 33, as in this case the fluid itself is opening the check valve 36 in this direction. Against an articulation process in the positive direction the apparatus does not exert any resistive force as long as the angle of articulation $\beta$ is not falling in the angular section $\beta_j$ of the same serial number ordered to the angular section $\beta_i$ including the steering angle $\alpha$. In this case the signal on the third output 111—and accordingly on the input 114, the output 118, the second input 127—stops and the slide valve 27 is travelling back into its central position. Simultaneously an output signal appears on the second output 110 resp. the second input 120. If the articulation process is continued with a further articulation of the trailer 3 in a positive direction, the real angle of articulation $\beta$ is leaving the angular section $\beta_j$ of identical serial number ordered to the angular section $\alpha$, and enters into the angular section $\beta_{j-1}$; as a consequence of the difference between the serial numbers the signal appears on the first output 109 as the sign of negative deflection, the signal is taken by the input 113 of the power amplifier 115, as well as by the first input 119 of the control circuit 122. The signal appearing on the output 117 of the power amplifier 115 is transmitted to the fourth input 123 of the control circuit 122, as well as to the first input 126 of the locking actuator 16. In case, if no fault has been detected by the control circuit 122 in the locking actuator 16, the actuating signal of high current-intensity arriving at the first input 126 deflects through the electromagnet 28 into the negative position the slide valve 27 of the three-position, four-way direction changing valve 26. In this position of the slide valve 27 the first connection 29, the fourth connection 31, as well the second connection 30 and the third connection 32 are opened to each other.

In the course of the articulation process in the positive direction the hydraulic fluid flows from the working chamber 24 of the hydraulic working cylinder 21 with the two working chambers through the line 20 to the second connection 30, therefrom to the third connection 32, now the check valve 36 in the hydraulic loop 33 is closing in this direction of streaming. Against the articulation process in the opposite negative direction the apparatus does not exert any locking effect, as the hydraulic liquid is flowing from the working chamber 25 through the line 19 to the first connection 29, therefrom it flows to the fourth connection 31, thereafter through the hydraulic loop 33, as in this case the fluid itself is opening the check valve in this direction.

The embodiments shown in FIGS. 7 to 9 are differing from the embodiment according to FIG. 6 regarding to the design of the angular position evaluating unit 13 and to the control thereof, as well as in respect to the control of the input code-signals, therefore only electronic evaluation and control will be detailed below.

According to the embodiment of the angular position evaluating unit 13 as to be seen in FIG. 7 the signal arrives in the Gray-code at the second input 107, which is characterizing the serial number of the sensed steering angle section $\alpha_i$. The code-converter 138 converts the signals received on its first input 107 from the Gray-code to binary code and the signal carrying the serial number appears in a binary code on the output 139. Similarly, the signal characterizing the serial number of the angle of articulation $\beta_i$ arrives in a Gray-code to the first input 90. The code-converter 144 converts the signals appearing on the first input 90 from the Gray-code to the binary code and the signal carrying the serial number apears in a binary code on the output 143. This signal is accepted by the first input 142 of the comparator circuit 141, while the signal on the output 139 is accepted by the second input 140 of the comparator circuit 141, which is comparing the two serial numbers. In case of identical serial numbers the signal appears on the second output 110; the signal—considered as negative—appears on the first output 109, if the serial number carried by the binary signal having arrived to the second input 140 is larger, than the serial number carried by the binary signal arriving to the second input 142; the signal—considered as positive—appears on the third output 111, if the serial number carried by the binary signal having arrived to the second input 140 is smaller, than the serial number carried by the binary signal arriving to the second input 142. Simultaneously code-control is also performed. The bit of the lowest local value of the binary signal appearing on the output 139 of the code-converter 138 characterizes the parity of the Gray-code having been converted into the binary code. This bit is received by the first input 145 of the inverting OR-gate 147, the other input of which is identical with the fifth input 106, on which the control signal arrives from the steered angle sensing unit 10. In case, if the two input signals equal to zero, on the output of the inverting OR-gate 147 an error signal appears, this signal is received by the second input 151 of the OR-gate 152 and an error signal is generated on its output which is identical with the fourth output 112.

Similarly, the bit of the lowest local value of the binary signal appearing on the output 143 of the code-converter 144 characterizes the parity of the Gray-code having been converted into a binary code. This bit is received by the input 146 of the inverting OR-gate, the other input of which is identical with the fourth input 89, on which the control signal arrives from the unit 15 sensing the angle of articulation. In so far as both input signals equal to the bit value of zero, on the output 150 of the inverting OR-gate 148 the error-signal appears, which is received by the second input 153 of the OR-gate 152, whereupon an error signal is given on the fourth output 112.

With the embodiment of the angular position evaluating unit 13 to be seen in FIG. 8, the signal arrives in a Gray-code on the second input 107, which is characterizing the serial number of the sense of steered angle section $\alpha_i$. The code-converter converts the signals having been received on the first input 107 into the binary code from the Gray-code and the signal carrying the serial number appears in a binary code on the output 130. Similarly, the signal being characteristic for the serial number of the sensed articulation angular section arrives to the first input 90 in a Gray-code. The code-converter 144 converts the signals coming from the first input 90 from the Gray-code into a binary code and the signal carrying the serial number appears on the output 143 in a binary code. This signal is received by the first input 142 of the comparator circuit 141, whle the signal on the output 139 is received by the second input 140, in the comparator circuit the two serial numbers are compared. In case of the compliance of the serial numbers the signal appears on the second output 110; the signal—considered as negative—appears on the first output 109, if the serial number carried by the binary signal having arrived at the second input 140 is larger, than the serial number carried by the binary signal having arrived to the second input 142; the signal—considered as positive—appears on the third output 111, in so far as the serial number carried by the binary signal having arrived at the second input 140 is smaller, than the serial number carried by the binary signal having arrived at the second input 142. Simultaneously code-control is also performed. The signals in the Gray-code are transmitted from the second input 107 to date-input 154 of the gated parity control circuit 155, on the gate-input of which—which corresponds to the fifth input 106—the control signal appears as a gate-signal. The gate-signal equals to zero, this belongs to the signalling section 75, the parity of the Gray-code is controlled at this value by the parity control circuit 155; on the output 156 an error-signal is generated, if the Gray-code is sensed as of even-numbered parity. The error-signal is led from the output 156 to the second input 153 of the OR-gate 152, while an error-signal is given on the fourth output 112. The value of the bit belonging to the opening 74 of the code-disc 41 amounts to 1 if this signal appears on the fifth input 106, the control process in the parity control circuit 155 is stopped.

In a similar manner, the signals in a Gray-code coming from the first input 90 are received by the data-input 157 of the gated parity control circuit 158, on the gate-input of which—which is identical with the fourth input 89—the control signal as a gate-signal appears. The value of the gate-signal is zero, this belongs to the signalling section 75, at this value the gated parity control circuit 158 controls the parity of the Gray-code and if a Gray-code of even-numbered parity is detected, an error-signal appears on the output 159. From the output 159 the control signal arrives at the first input 152 of the OR-gate 152 and an error-signal is given on the fourth output 112.

The solution to be seen in FIG. 9 enables the control of the angular position evaluating unit 13, by the aid of which the driver of the vehicle gets direct information on the momentary operational state. In addition, it ensures the control of the electric/electronic part of the control unit 12 from the lines of the electromagnets 28 actuating the slide valve 27.

The signals appearing on the first output 109, the second output 110 and the third output 111 are switching in the order of sequence of the light signals 160, 161, 162, on the other hand they control the registering inputs 166 resp. 171 of the bistable circuits 167 resp. 170 through the levelling circuits 163 resp. 164 in such a manner that in case of a negative differential sign one output 175, in case of a positive differential sign the output 176 is brought to the logical high level. This kind of control is based on the recognition that at the faultless operation of the apparatus affecting the jackknifing angle of the course of the transition from the positive differential sign to the negative differential sign always a state showing identity must exist, that means, that control signals are never simultaneously appearing on the registering inputs 166 resp. 171 of the bistable circuits 167 and 170 and in the interval between the change of the control signals of the registring inputs 166 and 171 a signal must be always produced which is setting back to the starting position on the erasing inputs 168 and 169.

In case of failure of the electronic parts outputs 175 and 176 of the bistable circuits 167 and 170 are simultaneously on logical high level, under the influence of the signal arriving through the inputs 177 and 179 of the AND-gate 178 an error-signal appears on the output 125.

In the apparatus affecting the angle of jackknifing i.e. in the angular position evaluating unit instead of the light-transmitting openings, light-sources and light sensing elements according to the Gray-code any other elements may be used being suitable for recording and reading discrete code-signals, as e.g. magnetic disc or detectors based on the Hall-effect.

Up to now we have described in detail the operation of the angular position evaluating unit in connection with the operation of the apparatus affecting the angle of jackknifing in the position of the articulated bus as shown in FIG. 1. Below we describe in detail the elements exerting the force for affecting the angle of articulation and the operation of the locking actuator 16 in any possible condition.

In the negative deflected state of the slide valve 27 of the three-position, four-path direction changing valve 26 between the first connection 29 and the fourth connection 31, as well as between the second connection 30 and third connection 32 a hydraulic connection is established. In this position the apparatus resists the articulation process in the positive direction, i.e. it performs locking, as in case of articulation in the positive direction the hydraulic working cylinder 21 with the two working chambers displaces in the direction of compression, that means that the hydraulic fluid is flowing from the second working chamber 24 of the working cylinder 21 through the line 20, the second connection 30 and the third connection 32 connected thereto, thereafter the check valve 36 gets into a close position against the flow of said direction, representing the positive output signal of the change of articulation angle direction. In order to restrict magnitude of counterpressure, the fluid—by-passing the check valve 36—arrives through the pressure limiting valve 34 into the first working chamber 25 through the fourth connection 31, the first connection 29 connected thereto and the line 29. The piston 23 must overcome in the second working chamber 24 the pressure having been formed in an extent determined by the pressure liming valve 34.

In case of a change in the negative direction the hydraulic working cylinder 21 with the two working chambers displaces in the direction of pulling-apart, that means that the hydraulic fluid is flowing from the first working chamber 25 of the hydraulic working cylinder 22 through the line 19, the first connection 29 and the fourth connection 31 connected thereto, therefrom through the check valve 36—which is opening against the flow of this sense, as the negative signal of the change of direction of the angle of articulation—to the third connection 32 and to the second connection 30 connected therewith, and at least it streams through the line 20 into the second working chamber 24. A flow in this direction does not require an appreciable pressure differential, accordingly, the apparatus does not exert considerable resistance against the process of articulation.

In the positive deflected position of the slide valve 27 of the three-position, four-path direction changing valve 26 between the first connection 29 and the third connection 32, as well as the second connection 30 and the fourth connection 31 hydraulic connection is established. In this case the apparatus resists the articulation process in the negative direction, i.e. blocking is taking place, as in case of articulation in the negative direction the hydraulic cylinder 21 with the two working chambers is displaced in the direction of pulling apart, as a consequence, the hydraulic fluid is flowing from the first working chamber 25 of the working cylinder 22 through the line 19, the first connection 29 and the third connection connected therewith, while the check valve 36 gets in its closed position against the stream of this sense, as the negative output signal of the change of direction of the angle of articulation.

To limit the magnitude of the counter momentum, the fluid can reach the second working chamber 24, avoiding the check valve 36, through the pressure limiting valve 34, the fourth connection 31 and the second connection 30, as well as the line 20. The piston 23 has to defeat the pressure determined by the pressure limiting valve 34, in the first working chamber 25.

In case of a positive change in the angle of articulation the hydraulic working cylinder 21 with the two working chambers is moving in the direction of compression, that means that the hydraulic fluid is flowing from the second working chamber 24 of the working cylinder 22 through the line 20, the second connection 30, the fourth connection 31 connected therewith and through the check valve 36, which opens against the flow of this sense for the change in angle of articulation to the first connection 29 connected thereto, thereafter the fluid arrives through the line 19 to the first working chamber 23. A flow in this direction does not require an appreciable differential pressure, accordingly, the apparatus does not considerably resist the process of articulation.

In a preferred embodiment of the invention the angular aperture of the sections following each other starting from the wheel steering angle of the straight forward motion, i.e. the angle of articulation of the same increases and in the vicinity of the maximal angular deflection decreases, and in the unit sensing the angle of articulation to the section of the angle of articulation with the beginning serial number and expediently to some following sections in the angle of articulation evaluating unit always the sign of the negative deflection is ordered, similarly, to the section of the angle of articulation of the highest serial number and expediently to some preceding sections in the angle of articulation evaluating unit always the sign of the positive deflection is ordered.

The electronic apparatus for sensing the angular position and evaluating the same can be used in any follow-system where the output sign from the extent of the deviation is independent. So the unit sensing the steering angle can be considered as first angle sensing unit, the unit sensing the articulation angle can be considered as a second angle sensing unit.

What we claim is:

1. In an apparatus for an articulated vehicle with front and trailing parts connected with an articulating hinge, for preventing jackknifing, wherein the front part has steered front wheels, the apparatus having locking means connected to the parts of the vehicle, a sensor for the steered angle of the front wheels of the vehicle, a sensor for the actual angle of articulation and an angular position evaluating unit connected to the locking means and the two sensors, the improvement wherein: the sensor for sensing the steered angle has a movable first element coupled to the steered wheel and a stationary second element, one of the first and second elements being divided into sections starting from the position of the steering to the left, means for producing a discrete signal for each single section referring to its relative position and having a value differing from that of the other sections and means for producing a digital output signal characteristic of a serial number for each section, the sensor for sensing the angle of articulation having a displaceable third element connected to one of this vehicle parts, and a stationary fourth element, wherein one of the third and fourth elements is divided into sections starting from the position of articulation being fully left for producing a digital output signal for each section representative of a serial number and a discrete signal representing the relative position of the section and which has a value which is different from that of the other sections; wherein in the two sensors the angles forming the limit of the sections have identical serial numbers and are formed by the steering angles and the angles of articulation; wherein the angular position evaluating unit has means receptive of the output signals from the two sensors for comparing same and for producing a first output if the serial number of the steering angle section is less than the serial number of the section of the angle of articulation and the difference between the serial numbers is greater than a predetermined value and for producing a second output signal if the serial number of the section of the steering angle is greater than the serial number of the section of the the angle of articulation and the difference between the serial numbers is greater than a predetermined value.

2. Apparatus as in claim 1, wherein the evaluating unit produces the second output when the signal from the sensor for articulation represents at least the starting serial number and produces the first output when it represents at least the highest serial number.

3. Apparatus as claimed in claim 1, wherein starting from straight forward motion, the angular aperture of the sections following each other increases and decreases in the vicinity of the maximal angular deflection.

4. Apparatus as claimed in claim 1, wherein the movable first element comprises a rotary disc having a code-field and the displaceable third element comprises a rotary disc having a code-field.

5. Apparatus as claimed in claim 4, wherein the code-fields comprise light transmitting opening rows formed according to the Gray-code, and the sensors further comprise light sources of said rotary discs, light-sensing elements on the other side of the discs and facing said light sources and connected by information transmitting elements to the angular position evaluating unit for comparing the code-signal of the sensed steering-angle section ($\alpha_i$) with the code-signal of the sensed angle of articulation ($\beta_i$), 6. Apparatus as claimed in claim 5, wherein each disc has a control code-field with signalling sections corresponding to the angular odd-numbered serial numbers and light-transmitting openings corresponding to even serial numbers, the arc of which penetrates to both confining angular sections, wherein the angular position evaluating unit has a fourth output signalling an error, on which an error-signal is produced exclusively to the state when the parity of the signal for the Gray-coded angular section of the same disc is not odd-numbered.

7. Apparatus as claimed in claim 6, wherein the angular position evaluating unit comprises first and second code-converters for receiving the first input and the second input and for converting the Gray-code into a binary code, a comparator circuit receptive of the output of the first code-converter and the second code converter, first and second inverted OR-gates each receptive of the output of one code converter and the other inputs receptive of the discrete signals, an OR-gate receptive of the outputs of the two inverted OR-gates and whose output is identical with the error-signalling output of the angular position evaluating unit.

8. Apparatus as claimed in claim 6, wherein the angular position evaluating unit comprises first and second code-converters receptive of the digital signals for converting Gray-code into a binary code, a comparator circuit receptive of the outputs of the two code-converters, two gated parity controlling circuits receptive of the digital signals and the discrete signals for controlling the parity of the Gray-code and an OR-gate receptive of the outputs of the two parity controlling circuits.

9. Apparatus as claimed in claim 6, wherein the angular position evaluating unit comprises a memory with a fixed program, the address-lines of which are receptive of the digital and discrete signals and wherein the data-outputs of the memory forming the outputs of the angular position evaluating unit and the error-signal output.

10. Apparatus as claimed in claim 1, wherein the locking means comprises an electromagnetically actuated three-position, four-path direction changing valve, having a first connection connected to one working chamber of a hydraulic piston with two working chambers, a second connection connected to the second working chamber, a third and a fourth connection connected by a hydraulic loop having a check valve therein to close off flow from the direction of the third connection toward the fourth connection, wherein in a central resting position of the slide of the three-position, four-path direction changing valve at least the first connection, the second connection and the fourth connection are opened to each other, in a negative controlled position the first connection and the fourth connection as well as the second connection and the third connection are opened to each other, in a positive controlled position the first connection and the third connection as well as the second connection and the fourth connection are opened to each other, wherein the locking means forms articulation direction giving means, whereby the open position of the check-valve forms a positive output signal, when the three-position, four-path direction changing valve is in a positive position, and a negative signal when the three-position, four-path direction changing valve is in a negative position, the closed position of the check-valve forms a negative output signal in the positive position of the three-position, four-path direction changing valve and a positive output signal in the negative position of the three-position, four-path direction changing valve.

* * * * *